(12) United States Patent
Zeiler et al.

(10) Patent No.: US 11,714,813 B2
(45) Date of Patent: Aug. 1, 2023

(54) SYSTEM AND METHOD FOR PROPOSING ANNOTATIONS

(71) Applicant: CLARIFAI, INC., Wilmington, DE (US)

(72) Inventors: Matthew Donald Zeiler, Fort Lee, NJ (US); Aviral Kulshreshtha, Harju (EE)

(73) Assignee: Clarifai, Inc., Wilmington, DE (US)

( * ) Notice: Subject to any disclaimer, the term of this patent is extended or adjusted under 35 U.S.C. 154(b) by 196 days.

(21) Appl. No.: 17/224,362

(22) Filed: Apr. 7, 2021

(65) Prior Publication Data

US 2022/0327133 A1    Oct. 13, 2022

(51) Int. Cl.
  *G06F 16/2457*    (2019.01)
  *G06F 40/169*    (2020.01)
  *G06F 16/28*    (2019.01)

(52) U.S. Cl.
  CPC .. *G06F 16/24573* (2019.01); *G06F 16/24578* (2019.01); *G06F 16/287* (2019.01); *G06F 40/169* (2020.01)

(58) Field of Classification Search
  None
  See application file for complete search history.

(56) References Cited

U.S. PATENT DOCUMENTS

| | | | | |
|---|---|---|---|---|
| 10,467,501 | B2* | 11/2019 | N | G06T 7/75 |
| 10,474,928 | B2* | 11/2019 | N | G06T 7/60 |
| 11,354,587 | B2* | 6/2022 | Bly | G06F 18/24 |
| 2003/0212544 | A1* | 11/2003 | Acero | G06F 40/30 |
| | | | | 704/9 |
| 2019/0130214 | A1* | 5/2019 | N | G06T 7/60 |
| 2019/0130292 | A1* | 5/2019 | N | G06N 5/047 |
| 2020/0250562 | A1* | 8/2020 | Bly | G06F 16/24578 |
| 2022/0327133 | A1* | 10/2022 | Zeiler | G06F 40/30 |
| 2023/0046324 | A1* | 2/2023 | Bly | G06N 20/00 |
| 2023/0060252 | A1* | 3/2023 | Bly | G06F 16/9024 |

* cited by examiner

*Primary Examiner* — Kim T Nguyen
(74) *Attorney, Agent, or Firm* — Buckley, Maschoff & Talwalkar LLC (57) ABSTRACT

Systems, methods and computer program code to propose annotations are provided which include identifying an input, applying a grouping model to the input to predict at least a first grouping concept associated with the input, comparing the at least first grouping concept to a set of relationship data to select at least a first ranking model, applying the at least first ranking model to the input to predict at least a first ranking concept associated with the input, and causing a user interface to display the input, the at least first grouping concept and the at least first ranking concept to a user as proposed annotations of the input.

20 Claims, 8 Drawing Sheets

SYSTEM AND METHOD FOR PROPOSING ANNOTATIONS

BACKGROUND

The fields of artificial intelligence and machine learning are increasingly impacting how organizations conduct business and research. An important aspect of implementing artificial intelligence and machine learning models is the development and training of those models. Often, the adoption of an artificial intelligence application requires substantial human interaction to perform tasks such as organizing content or training models. For example, one particular area that requires substantial effort is the review and annotation of input data for use in training or otherwise developing models.

It would be desirable to provide systems and methods for proposing annotations which substantially reduce the time and complexity of performing such annotations.

SUMMARY

According to some embodiments, systems, methods, apparatus, computer program code and means are provided to propose annotations which include identifying an input, applying a grouping model to the input to predict at least a first grouping concept associated with the input, comparing the at least first grouping concept to a set of relationship data to select at least a first ranking model, applying the at least first ranking model to the input to predict at least a first ranking concept associated with the input, and causing a user interface to display the input, the at least first grouping concept and the at least first ranking concept to a user as proposed annotations of the input.

Pursuant to some embodiments, the at least first ranking model has a predefined relationship to the at least first grouping concept. Pursuant to some embodiments, the grouping model further predicts at least a second grouping concept associated with the input and processing further includes comparing the at least second grouping concept to the set of relationship data to select at least a second ranking model and applying the at least second ranking model to the input to predict at least a second ranking concept associated with the input.

Pursuant to some embodiments an input is received from the user selecting at least one of the first grouping concept and the at least first ranking concept as an annotation. Information associated with the annotation is then stored in association with the input. In some embodiments, an input is received from the user to create a new relationship based on selecting at least one of the first grouping concept and the at least first ranking concept.

A technical effect of some embodiments of the invention is an improved and computerized way of automatically generating annotation proposals to provide improved results when tagging and annotating large quantities of input data. With these and other advantages and features that will become hereinafter apparent, a more complete understanding of the nature of the invention can be obtained by referring to the following detailed description and to the drawings appended hereto.

DETAILED DESCRIPTION

An enterprise may want to annotate large amounts of data for the purpose of organizing content or for training artificial intelligence ("AI") models. By way of example, an enterprise that is developing a model to identify products in images may need to tag or "annotate" a large number of images to train and improve one or more models to identify those products. Unfortunately, such annotations can be time consuming and the amount of effort and time required to properly annotate a sufficient number of input images can impair the ability to train models that perform at a high degree of accuracy. Applicants have recognized that it would further be desirable to provide systems and methods to improve the efficiency and throughput of annotation processing.

Features of some embodiments will now be described by first referring to FIG. 1 which is a block diagram of a system 100 according to some embodiments of the present invention. As shown, system 100 includes an annotation platform 120 which receives inputs 102 (such as images, videos or the like) and which produces outputs (stored as output data 136) such as annotations and other information associated with the application of one or more models to the inputs 102. The system 100 allows one or more users operating user devices 104 to interact with the annotation platform 120 to perform annotation processing of those inputs 102 as described further herein. The annotation platform 120 includes one or more modules that are configured to perform processing to improve annotation efficiency and throughput, allowing users operating user devices 104 to quickly and accurately annotate large quantities of inputs 102. For example, pursuant to some embodiments, the annotation platform 120 is configured to generate optimized user interfaces (e.g., via one or more user interface modules 114) based on automatically proposed annotations to improve annotation efficiency of users operating user devices 104. The proposed annotations may be generated using one or more models that operate on inputs 102 to reduce the amount of effort or interactions required by the users.

Pursuant to some embodiments, the system 100 includes components and interfaces that allow the automated proposal of relevant annotations to a user to improve the efficiency and throughput of annotation processing of inputs 102. The system 100 may generally be referred to herein as being (or as a part of) a "machine learning system". The system 100 can include one or more models that may be stored at model database 132 and interacted with via a component or controller such as model module 112. In some embodiments, one or more of the models may be so-called "classification" models that are configured to receive and process inputs 102 and generate output data 136. As used herein, the term "classification model" can include various machine learning models, including but not limited to a "detection model" or a "regression model." The present application includes an annotation platform 120 that includes (or interacts with) one or more models (such as classification models) that are configured to process input and provide predictions, and one or more subsystems that are configured to process the input as well as output from the models.

While embodiments are described herein in relation to "classification models" and predictions or concepts associated with those models, those embodiments are not intended to be limiting and are provided as examples. Embodiments may be used in connection with outputs form other types of models and outputs so long as there is a way to group, rank and relate the outputs from those models. For example, while the term "concept" is used (and is used as generally referring to an output or prediction from a model such as a classification model), those skilled in the art, upon reading the present disclosure, should appreciate that embodiments may be used in conjunction with other types of model outputs. Embodiments allow users to be more efficient in performing activities such as labeling, annotating or otherwise validating information output from machine learning models.

As an example, the annotation platform 120 may be configured to propose annotations for inputs 102 such as images or videos. For simplicity and ease of exposition, the term "image data" may be used herein to refer to both still images and videos. The annotations may be proposed using one or more classification or other models as will be described further herein.

The annotation platform 120 may further include a relationship module 116 which interacts with relationship data 134 to provide links or relationships between concepts. As will be described further below, in some embodiments, relationships may establish links between concepts and may be used to determine which models should be applied for a given input. As a specific example, in some embodiments, a grouping model may be applied to identify a first set of concepts associated with an input. Those concepts may then be evaluated by the relationship module 116 and relationship data 134 to determine whether a child model (or "ranking model") should be applied to the image. By providing a semantic relationship between multiple models, embodiments allow concepts associated with an input to be identified with a greater degree of specificity.

Pursuant to some embodiments, the details of relationships are provided as links in a knowledge graph linking the concepts that one model (such as the grouping model) outputs to the concepts another model (such as a child or ranking model) outputs. Pursuant to some embodiments, the grouping model essentially operates to predict groups of concepts associated with an input and one or more child or ranking models may then be applied to those concepts to rank the concepts presented within each group.

According to some embodiments, an "automated" annotation platform 120 may access relationship data in relationship database 134 as well as model data in model database 132 to automatically propose annotations as described further herein. As used herein, the term "automated" or "automatic" may refer to, for example, actions that can be performed with little or no human intervention.

In some embodiments, a user device 104 may interact with the annotation platform 120 via a user interface (e.g., via a web browser) where the user interface is generated by the annotation platform 120 and more particularly by the user interface module 114. In some embodiments, the user device 104 may be configured with an application (not shown) which allows a user to interact with the annotation platform 120. In some embodiments, a user device 104 may interact with the annotation platform 120 via an application programming interface ("API") and more particularly via the interface module 118. For example, the annotation platform 120 (or other systems associated with the annotation platform 120) may provide one or more APIs for the submission of inputs 102 for processing by the annotation platform 120.

For the purpose of illustrating features of some embodiments, the use of a user interface (such as a web browser or application interface) will be described; however, those skilled in the art, upon reading the present disclosure, will appreciate that similar interactions may be achieved using an API. Illustrative (but not limiting) examples of a user interface pursuant to some embodiments will be described further below in conjunction with FIGS. 4-6.

The system 100 can include various types of computing devices. For example, the user device(s) 104 can be mobile devices (such as smart phones), tablet computers, laptop computer, desktop computer, or any other type of computing device that allows a user to interact with the annotation platform 120 as described herein. The annotation platform 120 can include one or more computing devices including those explained below with reference to FIG. 7. In some embodiments, the annotation platform 120 includes a number of server devices and/or applications running on one or more server devices. For example, the annotation platform 120 may include an application server, a communication server, a web-hosting server, or the like.

The devices of system 100 (including, for example, the user devices 104, inputs 102, annotation platform 120 and databases 132, 134 and 136) may communicate using any communication platforms and technologies suitable for transporting data and/or communication signals, including any known communication technologies, devices, media, and protocols supportive of data communications. For example, the devices of system 100 may exchange information via any wired or wireless communication network such as the Internet, an intranet, or an extranet. Note that any devices described herein may communicate via one or more such communication networks.

Figure 1:
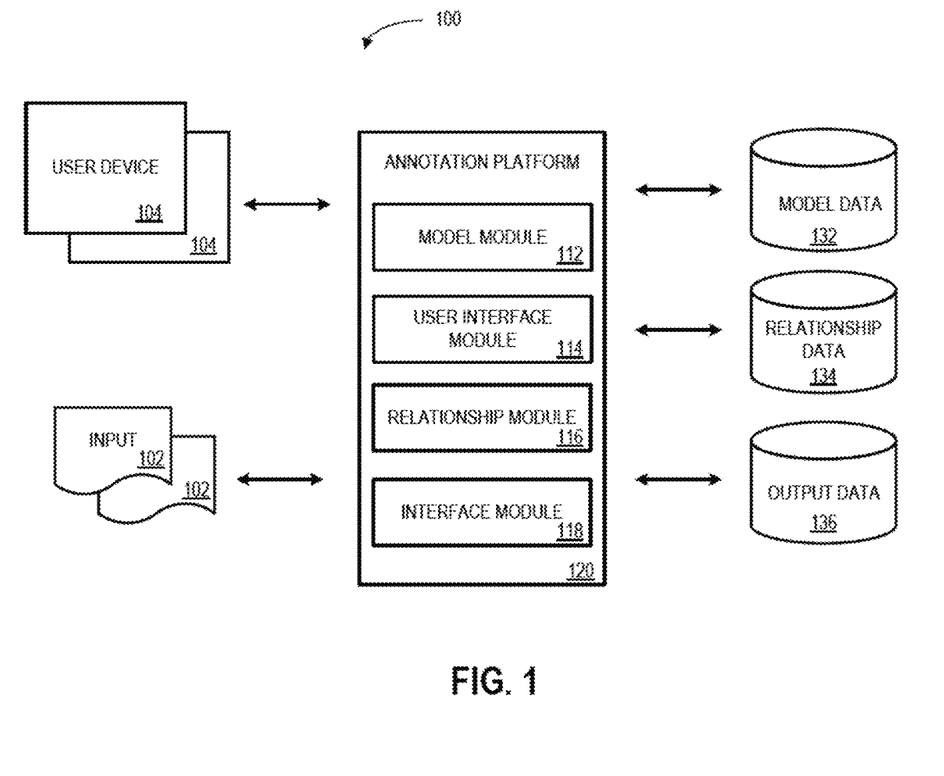
FIG. 1 is block diagram of a system pursuant to some embodiments.

Although a single annotation platform 120 is shown in FIG. 1, any number of such devices may be included. Moreover, various devices described herein might be combined according to embodiments of the present invention. For example, in some embodiments, the annotation platform 120 and relationship database 134 (or other databases) might be co-located and/or may comprise a single apparatus.

The system 100 may be operated to facilitate efficient and accurate annotation of input data. Prior to a discussion of an annotation process flow in conjunction with FIG. 2, a brief illustrative (but not limiting) example will first be introduced. In the illustrative example, an organization uses the system 100 of the present invention to annotate a large number of images. In particular, the organization uses the system 100 to identify animals and pets in a large number of photos. The organization creates a workflow in which the photographs are provided as the inputs 102 and selects to use a grouping model which is able to accurately identify when an animal or pet is in a picture. The organization further selects to use at least one ranking model that is capable of accurately identifying types of animals or pets and which have semantic relationships with concepts from the grouping model. For example, if the grouping model identifies that a picture contains an animal or pet, a ranking model may be invoked to perform further processing on the image (e.g., to identify the animal as a "cat" or "dog"). In the illustrative example, a user (e.g., operating a user device 104) may review the outputs from the grouping model and the ranking model and confirm which of the proposed annotations should be used. Further, the user may interact with the outputs to create new concepts for the relationship data. This illustrative example will further be described by referring to FIGS. 4-6 which depict portions of user interfaces that may be created during processing of the present invention.

Figure 2:
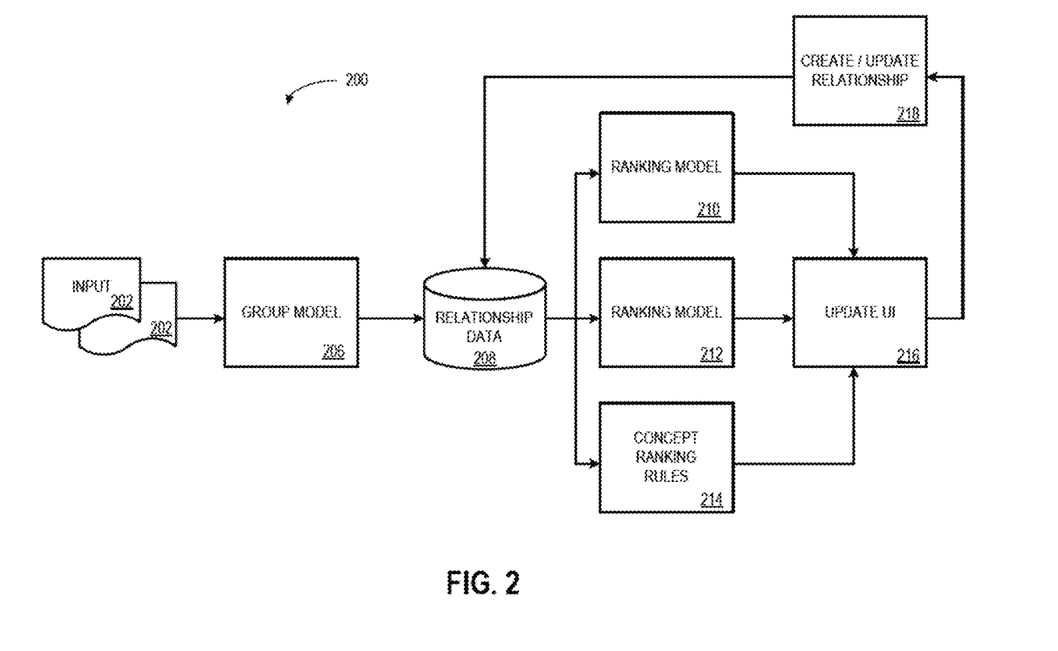
FIG. 2 illustrates a process pursuant to some embodiments.

Reference is now made to FIG. 2 where an annotation process 200 is shown that might be performed by some or all of the elements of the system 100 described with respect to FIG. 1 according to some embodiments of the present invention. The flow charts and process diagrams described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

In some embodiments, an annotation platform 120 may allow users to create "applications" or "workflows" which specify how inputs are to be processed. For example, in the annotation process 200, a user may have specified which group model 206 and ranking model(s) 210, 212 to use. The process 200 will be described using the illustrative example introduced above and in which a user has configured the process to support the annotation of animal and pet images. Further, the process 200 will be illustrated by reference to user interfaces of FIGS. 4-6.

Figure 4:
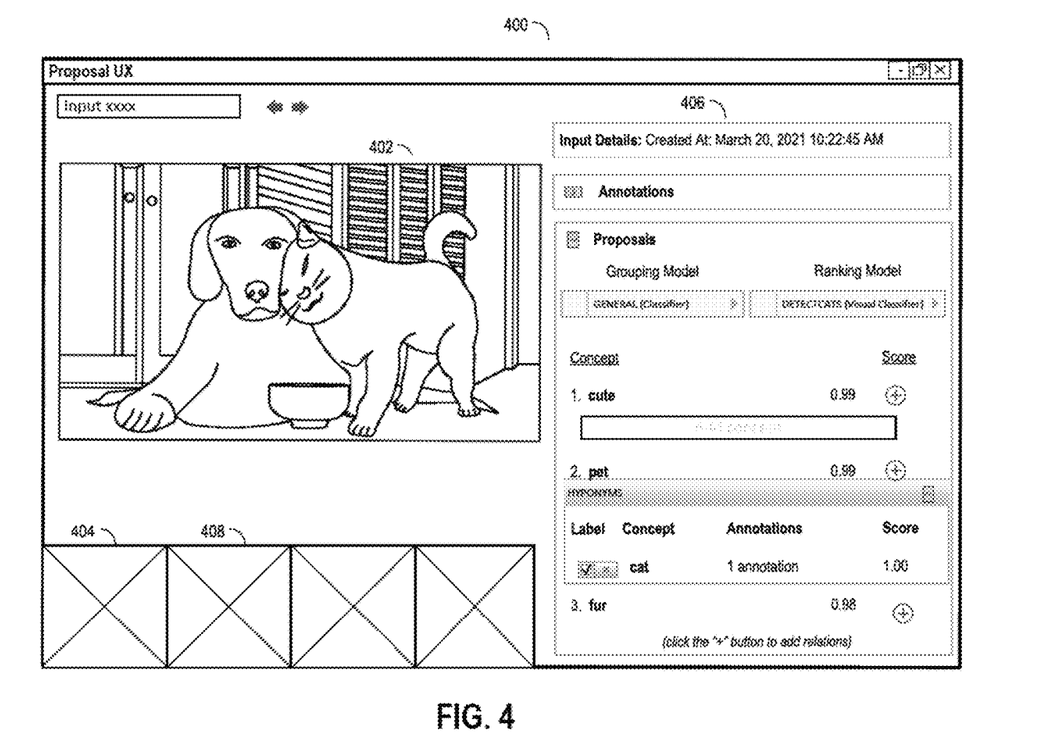
FIGS. 4-6 illustrate portions of a user interface that may be used pursuant to some embodiments.

Annotation process 200 includes providing one or more inputs 202 to a group model 206. Continuing to refer to the illustrative example introduced above, the group model 206 is a classification model that has been trained to identify objects in an image. In general, the group model 206 may be trained to perform a top level of classification (e.g., to identify "animals", "people" or the like). Referring briefly to FIG. 4, the input 202 may be an image showing a cat and a dog (shown as item 402 of FIG. 4).

The group model 206 takes the image as the input 202 and outputs one or more predictions including, for example, information identifying one or more concepts that the model has predicted are contained in the input 202. In the illustrative example, the concepts "pet" and "animal" may be identified in the image. In some embodiments, the group model 206 also outputs a confidence score for each concept. For example, the confidence score may be a Softmax (or other) score generated by the group model indicating a relative level of confidence the model has in the prediction. Generally, such confidence scores are between 0.00 and 0.99 (with 0.99 indicating a high degree of confidence).

The output from the group model 206 may be provided to a filter or selection mechanism that compares the output (e.g., the "concepts" predicted by the group model 206) to a set of relationship data 208. The relationship data 208 defines links between concepts of the group model 206 to concepts of one or more ranking models 210. For example, continuing the illustrative example, the concept "pet" may be output from the group model 206 and provided to the relationship data 208 where a determination is made that inputs classified with the concept "pet" should be further classified using a specific ranking model 210 (as the ranking model 210 has a relationship to the concept "pet"). For example, the specific ranking model 210 may be a model trained to specifically identify "cats" and types of cats.

In some embodiments, multiple ranking models 210, 212 may be provided. For example, in the illustrative embodiment, one ranking model 210 may be a cat detection model while another ranking model 212 may be a dog detection model. Further, in addition to (or instead of) a ranking model, one or more concept ranking rules 214 may be provided. These ranking rules may specify how concepts (from the group model 206 and any ranking models 210, 212) are to be ranked and displayed. For example, the rules 214 may specify a ranking by confidence scores, an alphabetical ranking, a timestamp ranking, a weighted ranking (e.g., by concept) or the like. Further, display rules such as the number of concepts to be shown may also be specified.

In the event that a ranking model 210 is part of the application and has been identified (based on the output from the group model 206), the ranking model 210 may then perform a classification of the input 202 and output one or more concepts detected by the ranking model 210 as well as confidence scores associated with each concept. Continuing the illustrative example, the ranking model 210 may identify that the input image contains a "cat". The relationship data 208 indicates that the concept "cat" is related to the concept "pet" and as a result, when the user interface is updated at 216, the concept "cat" may be associated with the "pet" concept.

For example, referring to FIG. 4, the user interface 400 includes a number of screen areas which allow a user to efficiently adopt, modify or reject annotations proposed by the system of the present invention. For example, as shown, a user interface 400 may include an area 402 where information associated with a current input is displayed to a user. In the user interface 400 illustrated in FIG. 4, the input is an image of a dog and a cat, and the user is tasked with accepting, modifying or rejecting one or more proposed annotations. The user interface 400 also includes an area 404 showing which input is currently selected as well as an area 406 from which one or more other inputs may be selected. Pursuant to some embodiments, when a different input is selected (e.g., from area 406), data associated with the current input 402/404 is automatically stored. In some embodiments, user action may be required to store or commit any data associated with an input.

Figure 5:
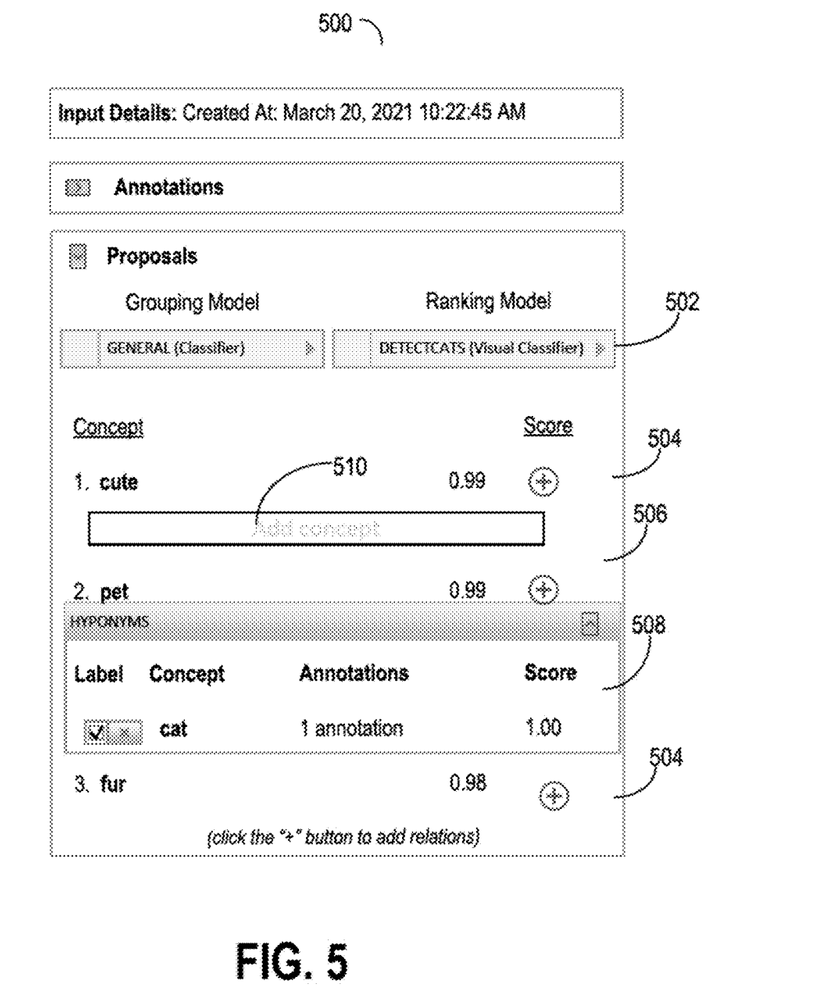

An annotation work area 406 is provided which will be described further below in conjunction with FIG. 5 and which presents proposed annotations to a user and allows the user to accept, modify or reject the proposed annotations quickly. For example, a user may simply agree with the proposed annotations and can navigate to the next input without requiring any action to accept the proposed annotations. In some embodiments, the user may be required to perform an action to quickly accept one or more proposed annotations. Referring now to FIG. 5, further details of the annotation work area 406 (of FIG. 4) are shown as item 500.

Annotation work area 500 includes a number of items of information that may dynamically change for each input. For example, information is shown at 502 identifying the grouping model that was used to predict concepts. Here, a "General" visual classifier was used as the grouping model. Information at 502 also identifies one or more ranking models that were used to rank proposed annotations for the user. In FIG. 5, the ranking model is a visual classifier named "DetectCats". A number of concepts 504 are shown, generally ordered by a confidence score (from highest to lowest). These concepts 504 are, for example, concepts predicted by the grouping model. The top concepts include the "pet" concept (indicating that the grouping model predicted that the input included the concept of "pet" with a high degree of confidence).

The annotation work area 500 of the user interface 400 also proposes at 508 that the input be annotated as having the "cat" concept suggested by the ranking model 210. In the illustrative annotation work area 500, a user may be presented with a number of proposed annotations (including the "cat" annotation). The user may also be presented with the confidence scores associated with each proposal and an option to accept the proposal (shown as a check mark button) or to reject the proposal (shown as an "X" button). Further, each of the concepts of the group model 206 are ranked by confidence score in the example of FIG. 5 (e.g., based on application of the concept ranking rules 214), and further, each of the proposals from the ranking model 210 may be ranked beneath each concept of the group model 206 to which it is related. In some embodiments, a large number of concepts may be identified by a grouping model. However, only a portion of those concepts may be relevant and presented to the user via the user interface of FIGS. 4 and 5 (e.g., concepts having a low ranking may be hidden so as to not distract the user and to allow the user to focus on the most relevant concepts as proposed annotations). While the concepts 504 are shown ranked based on confidence score, they may be ranked using other attributes as well (such as, for example, by name, date, ID or some other attribute).

Figure 6:
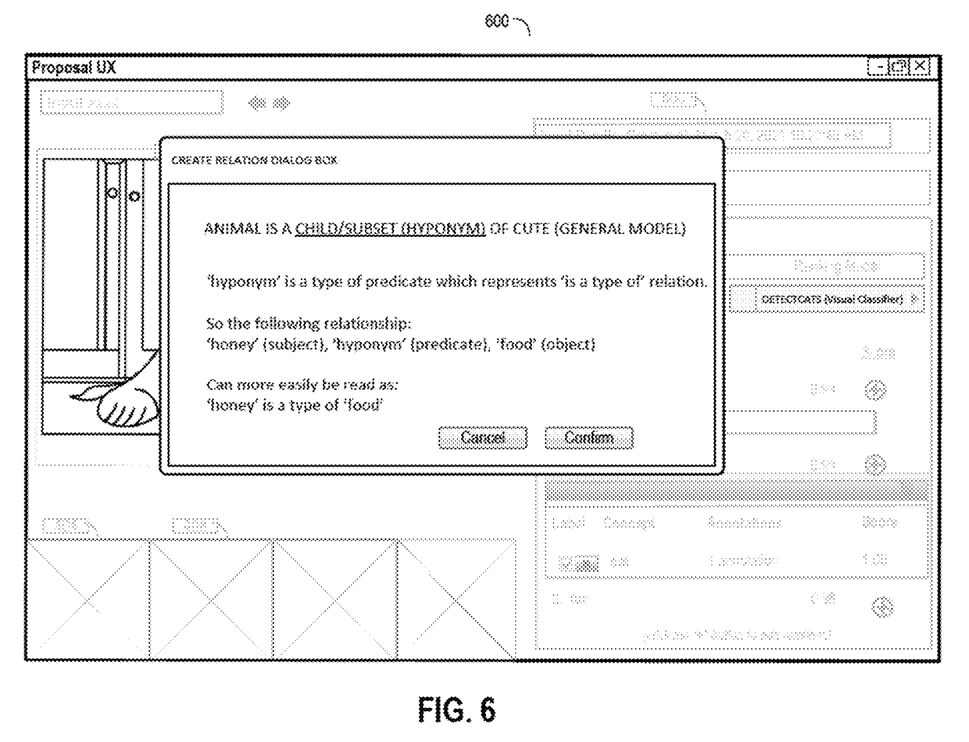

In some embodiments, a user may easily interact with the user interface 400 to quickly accept the annotation proposals of the system 100. Further, in some embodiments, the user may choose to create or update a relationship 218 by creating or updating a concept (as shown in the annotation work area 500 portion of the user interface 400 at 510). If the user clicks on the item 510 to add or update a concept, a dropdown or other user interface action may be presented to the user allowing the user to select an existing concept as an annotation or to create a new concept. If the user creates a new concept, the concept name is entered and then the user may be prompted to define the type of relationship the concept has to the concepts output from the group model 206 (e.g., via a screen such as shown in FIG. 6). In some embodiments, when a new concept is added, if a relationship doesn't already exist, the user specifies one. In some embodiments, a relationship type is specified (and may be, for example, a child relationship, a parent relationship or a synonym relationship). This information is stored in the relationship data store 208. In this manner, new annotations or concepts can quickly be added by a user while reviewing annotations and proposals from the ranking models 210, 212.

Pursuant to some embodiments, the presentation of the concepts and proposed annotations in the user interface displayed to the user is updated to reflect the concept ranking rules 214 and the results of the outputs of ranking models, thereby ensuring a clean and efficient workspace for users who are annotating inputs. Because the ranking models 210, 212 are configured to propose relevant and standardized concepts, the efficiency and accuracy of a user is significantly improved.

Commonly, the output of a model such as the grouping model 206 may include multiple concepts. In the illustrative example, the input 202 may be an image that contains both a cat and a dog. The grouping model 206 may result in the invocation of multiple ranking models 210, 212 each generating concepts and proposed annotations for display to a user.

Figure 3:
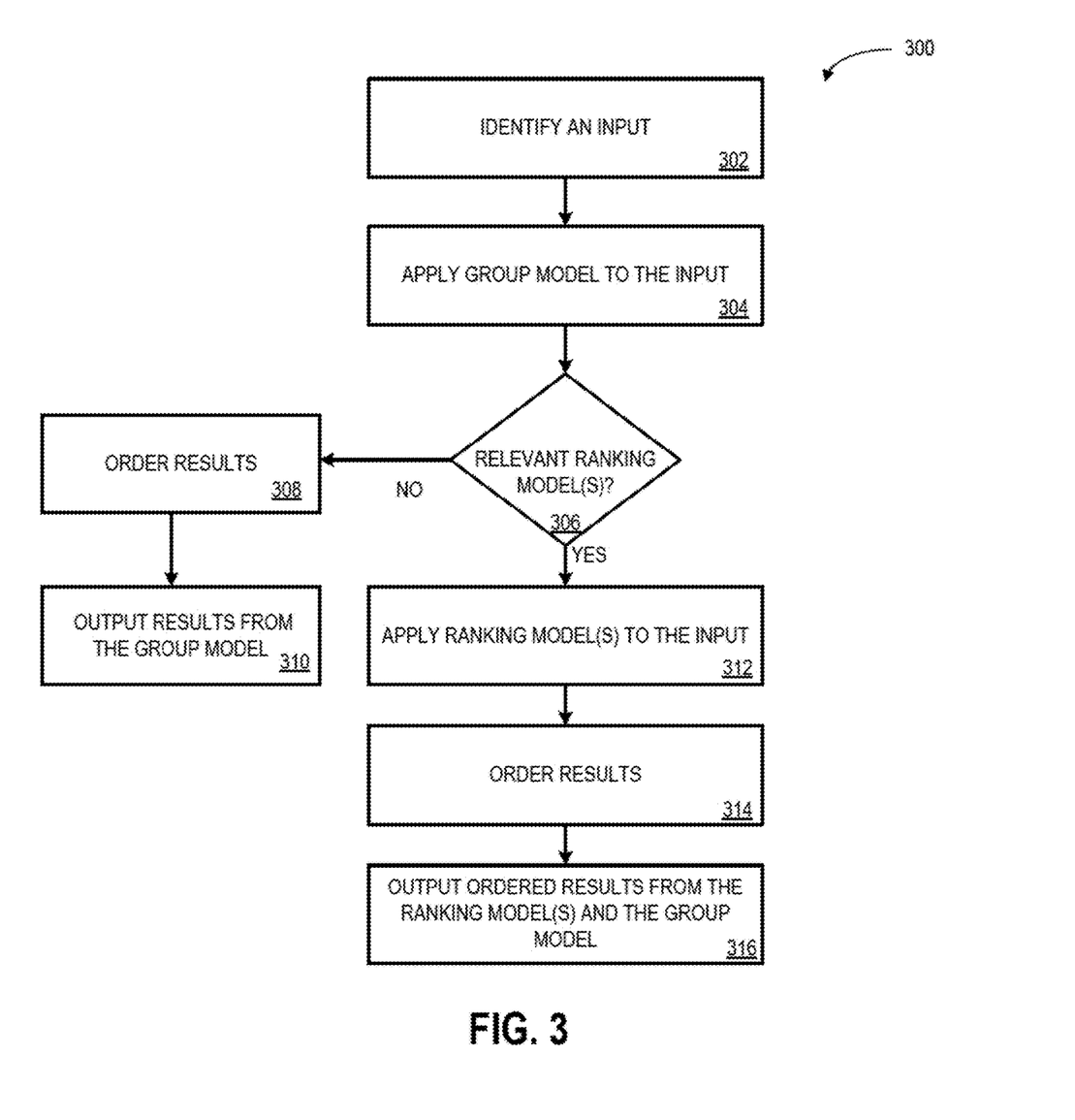
FIG. 3 illustrates a further process pursuant to some embodiments.

Reference is now made to FIG. 3 where a flow diagram depicting a annotation proposal process 300 is shown. Process 300 may be executed on or in conjunction with annotation platform 120 of FIG. 1 to produce an output such as the user interface 400 of FIG. 4. Process 300 begins at 302 where an input is identified (e.g., such as the next image to be processed). Processing continues at 304 where a grouping model is applied to the input to generate one or more predictions (e.g., such as one or more concepts from a classification model). Each prediction may be generated with an associated confidence score as described above.

The concepts or outputs from the grouping model are processed at 306 where a determination is made whether a ranking model is available that is relevant to one or more of the concepts. If the concepts are not relevant or associated with a ranking model, processing may continue at 308 where the outputs or results from the grouping model are ordered (e.g., by applying ranking rules such as the rules 214 of FIG. 2) and the ordered results are then displayed as proposed annotations for a user (e.g., via a user interface such as the interface 400 of FIG. 4). Processing may then continue with a next input (if any).

In some embodiments, processing at 306 may be performed to dynamically identify a relevant or optimal ranking model. For example, the concept (or concepts) output from the group model may be used to determine which of multiple ranking models should be used. As a simple example, if the grouping model identifies the concept "cat" in an input, and if ranking models for "cat breeds" and "dog breeds" are available, the "cat breed" ranking model will be dynamically selected for use.

If processing at 306 indicates that a ranking model is related to a concept identified by the group model (or if a ranking model is otherwise dynamically selected based on the concept), processing continues at 312 where the ranking model is applied to the input to generate one or more predictions (e.g., such as one or more concepts from a classification model). Each prediction may be generated with an associated confidence score as described above. The results may then be ordered (e.g., by applying ranking rules such as the rules 214 of FIG. 2) and the ordered results displayed as proposed annotations for a user (e.g., via a user interface such as the interface 400 of FIG. 4). In some embodiments, processing may continue where the user is prompted to accept or reject each proposed annotation. Further, processing may continue where the user is allowed to suggest or create new concepts and define the relationships of those new concepts.

Figure 7:
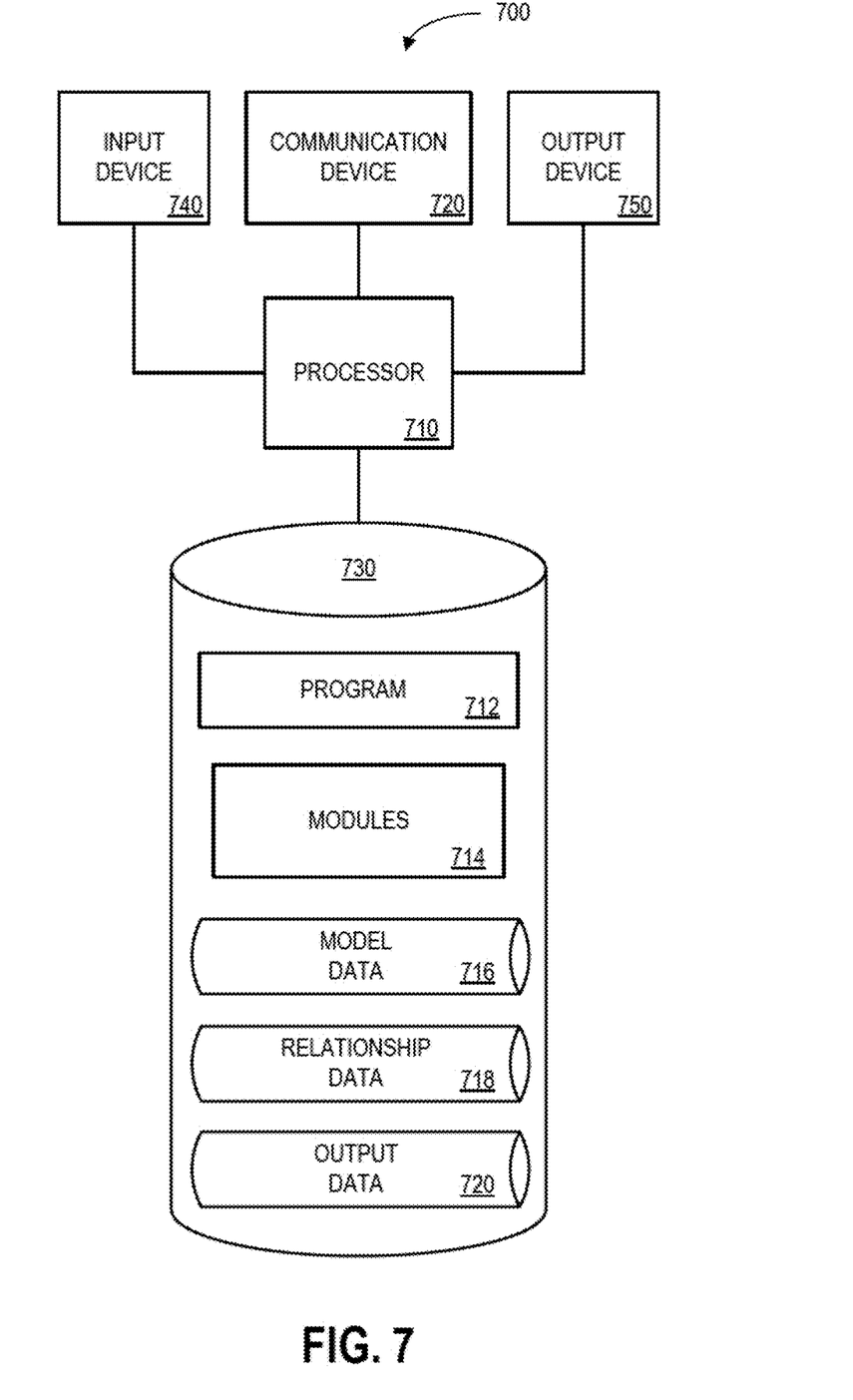
FIG. 7 is block diagram of an annotation platform pursuant to some embodiments.

The embodiments described herein may be implemented using any number of different hardware configurations. For example, FIG. 7 illustrates an annotation platform 700 that may be, for example, associated with the system 100 of FIG. 1 as well as the other systems and components described herein. The annotation platform 700 comprises a processor 710, such as one or more commercially available central processing units (CPUs) in the form of microprocessors, coupled to a communication device 720 configured to communicate via a communication network (not shown in FIG. 7). The communication device 720 may be used to communicate, for example, with one or more input sources and/or user devices. The annotation platform 700 further includes an input device 740 (e.g., a mouse and/or keyboard to define rules and relationships) and an output device 750 (e.g., a computer monitor to display reports and results to an administrator).

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or one or more software modules 714 (e.g., associated the user interface module, model module, relationship module, and interface module of FIG. 1) for controlling the processor 710. The processor 710 performs instructions of the programs 712, 714, and thereby operates in accordance with any of the embodiments described herein. For example, the processor 710 may receive input data and then perform processing on the input data such as described in conjunction with the process of FIGS. 2 and 3. The programs 712, 714 may access, update and otherwise interact with data such as model data 716, relationship data 718 and output data 720 as described herein.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the annotation platform 700 from another device; or (ii) a software application or module within the annotation platform 700 from another software application, module, or any other source.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 8:
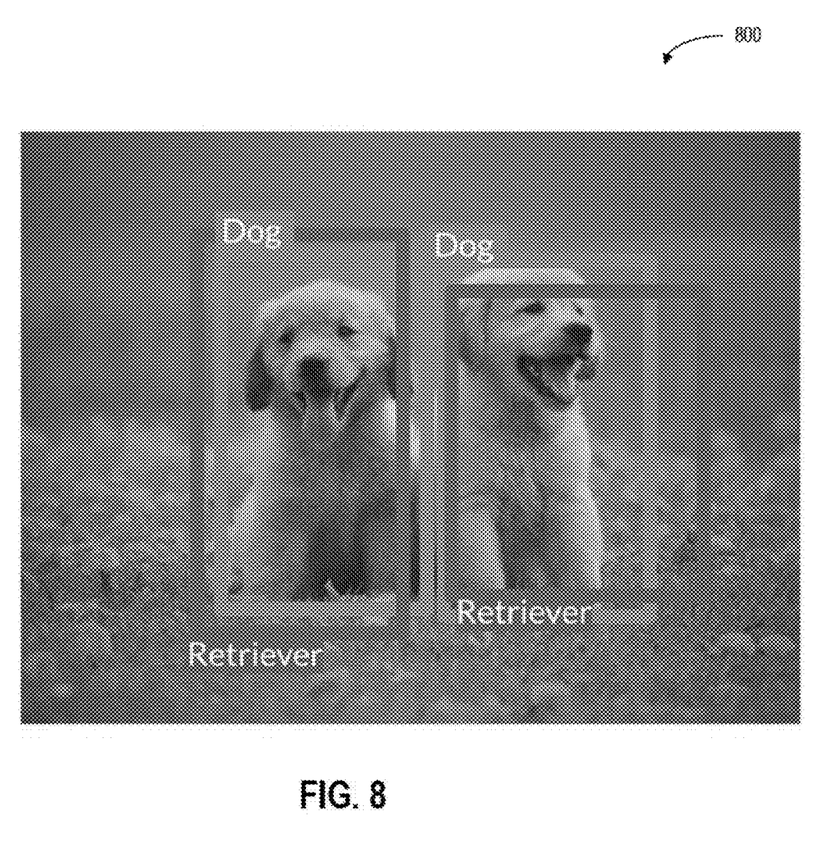
FIG. 8 is a portion of a user interface that may be used pursuant to some embodiments.

While features have been described by reference to the use in conjunction with "classification models", embodiments may be used with other types of models as well. Further, while embodiments have been described where a knowledge graph or relationship data are used to group or associate concepts (between a grouping model and one or more ranking models), other techniques may be used to group or associate outputs for use with the present invention. For example, referring now to FIG. 8, the use of bounding boxes to identify concepts are shown. In FIG. 8, a first set of bounding boxes are shown that may be associated with the output of a grouping model (in which the objects are identified as including the concept of a "dog"). The ranking model has drawn a second set of bounding boxes (that are substantially overlapping or similar to the first set of bounding boxes) and has identified the objects as including the concept of a "retriever". In some embodiments, if there is sufficient overlap or congruity between the bounding boxes generated by the grouping model and one or more ranking models, the objects may be considered a match, and therefore the ranking model concept may be proposed as an annotation. Such groupings have been found to provide desirable results in face detection models and the like.

Although specific hardware and data configurations have been described herein, note that any number of other configurations may be provided in accordance with embodiments of the present invention (e.g., some of the information associated with the databases described herein may be combined or stored in external systems).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A computer implemented method to propose annotations, comprising:
   identifying an input;
   applying a first machine learning model to the input to predict at least a first grouping concept associated with the input;
   comparing the at least first grouping concept to a set of relationship data to select at least a second machine learning model based on a relationship between the at least first grouping concept and the second machine learning model;
   applying the at least second machine learning model to the input to predict at least a first ranking concept associated with the input; and
   causing a user interface to display the input and the at least first grouping concept to a user as proposed annotations of the input.

2. The computer implemented method of claim 1, wherein the first machine learning model is a classification model trained to recognize at least a first grouping concept in an input.

3. The computer implemented method of claim 1, wherein the at least second machine learning model is a classification model trained to recognize at least a first ranking concept in an input.

4. The computer implemented method of claim 3, wherein the at least second machine learning model has a predefined relationship to the at least first grouping concept.

5. The computer implemented method of claim 1, wherein the first machine learning model further predicts at least a second grouping concept associated with the input, the method further comprising:
   comparing the at least second grouping concept to the set of relationship data to select at least a third machine learning model based on a relationship between the at least second grouping concept and the third machine learning model; and
   applying the at least third machine learning model to the input to predict at least a second ranking concept associated with the input.

6. The computer implemented method of claim 5, wherein the causing the user interface to display further comprises:
   causing the user interface to display the at least second ranking concept.

7. The computer implemented method of claim 1, wherein applying the first machine learning model to the input further comprises predicting a plurality of grouping concepts associated with the input.

8. The computer implemented method of claim 7, wherein applying the at least second machine learning model to the input further comprises predicting a plurality of ranking concepts associated with the input.

9. The computer implemented method of claim 8, further comprising:
   filtering the plurality of grouping concepts and the plurality of ranking concepts to select a set of concepts for display to the user.

10. The computer implemented method of claim 9, wherein the filtering is based on a confidence score associated with each one of the plurality of grouping concepts and each one of the plurality of ranking concepts.

11. The computer implemented method of claim 1, further comprising:
  receiving an input from the user selecting at least one of the first grouping concept and the at least first ranking concept as an annotation.

12. The computer implemented method of claim 11, further comprising:
  storing information associated with the annotation in association with the input.

13. The computer implemented method of claim 1, further comprising:
  receiving an input from the user to create a new relationship based on selecting at least one of the first grouping concept and the at least first ranking concept.

14. The computer implemented method of claim 13, further comprising:
  prompting the user to identify a type of the relationship; and
  updating the set of relationship data to include the new relationship and the type of the relationship.

15. The computer implemented method of claim 14, wherein the type is relationship is one of a child relationship, a parent relationship and a synonym relationship.

16. A system comprising:
  a processing unit; and
  a memory storage device including program code that when executed by the processing unit causes to the system to:
  applying a first machine learning model to an input to predict at least a first grouping concept associated with the input;
  comparing the at least first grouping concept to a set of relationship data to select at least a second machine learning model based on a relationship between the at least first grouping concept and the second machine learning model;
  applying the at least second machine learning model to the input to predict at least a first ranking concept associated with the input; and
  causing a user interface to display the input, the at least first grouping concept and the at least first ranking concept to a user as proposed annotations of the input.

17. The system of claim 16, wherein the causing the user interface to display further comprises:
  causing the user interface to display the at least second ranking concept.

18. The system of claim 16, wherein applying the first machine learning model to the input further comprises predicting a plurality of grouping concepts associated with the input.

19. The system of claim 18, wherein applying the at least second machine learning model to the input further comprises predicting a plurality of ranking concepts associated with the input.

20. The system of claim 19, further comprising:
  filtering the plurality of grouping concepts and the plurality of ranking concepts to select a set of concepts for display to the user.

* * * * *